(12) United States Patent
Haavisto (10) Patent No.: US 6,208,715 B1
(45) Date of Patent: Mar. 27, 2001

(54) METHOD AND APPARATUS FOR TRANSMITTING MESSAGES IN A TELECOMMUNICATION SYSTEM

(75) Inventor: Petri Haavisto, Tampere (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/068,161

(22) PCT Filed: Oct. 30, 1996

(86) PCT No.: PCT/FI96/00579

§ 371 Date: Aug. 25, 1998

§ 102(e) Date: Aug. 25, 1998

(87) PCT Pub. No.: WO97/16917

PCT Pub. Date: May 9, 1997

(30) Foreign Application Priority Data

Nov. 2, 1995 (FI) .......................................... 955266

(51) Int. Cl.⁷ ............................ H04M 1/64; H04M 11/00
(52) U.S. Cl. .................................. 379/88.07; 379/88.08; 379/93.08; 379/100.15; 379/100.17
(58) Field of Search ................... 379/67.1, 88.07–88.09, 379/88.17, 93.01–93.09, 100.15–100.17; 369/94; 704/201–224; 711/4–5, 11–114; 370/389, 351–401; 712/35–36

(56) References Cited

U.S. PATENT DOCUMENTS

| 4,476,559 | 10/1984 | Brolin et al. ................. 370/110.1 |
| 4,730,312 | 3/1988 | Johnson et al. ............... 370/110.1 |
| 4,742,550 | * | 5/1988 | Fette ............................... 704/219 |

(List continued on next page.)

FOREIGN PATENT DOCUMENTS

| 058 482 | 8/1982 | (EP) . |
| 082 333 | 6/1983 | (EP) . |
| 2 218 596 | 11/1989 | (GB) . |
| 404 982 | 11/1978 | (SE) . |
| 93-2501 | 12/1993 | (WO) . |

OTHER PUBLICATIONS

European digital cellular telecommunications system (Phase 2): Full rate speech transcoding, ETS 300 580–2 (GSM 06.10).
General aspects of digital transmission systems: Terminal Equipments: 7kHz audio–coding within 64 KBIT/S, ITU–T Recommendation G.722.
General aspects of digital transmission systems: Terminal Equipments: 5–, 4–, 3– and 2–Bits Sample Embedded Adaptive Differential Pulse Code Modulation (ADPCM).
Recommendation T/CS 46–02 (Innsbruck 1981, revised at Nice 1985), Multifrequency Signalling System To Be Used For Push–Button Telephones.
Patent Abstracts of Japan, vol.6, No. 238(E), s 58 tiivistelma Julkaisusta JP 57–138254, Julk, Aug. 8, 1982.

*Primary Examiner*—Fan Tsang
*Assistant Examiner*—Allan Hoosain
(74) *Attorney, Agent, or Firm*—Pillsbury Winthrop LLP Intellectual Property (57) ABSTRACT

A method and an apparatus for implementing the method, which allow a transmitter (100) of a digital telecommunication system transmitting speech to transmit predetermined messages to a receiver (102) over a speech channel (108). Messages (114) are transmitted from the transmitter (100) to the receiver (102) on the speech channel (108) in such a way that they are encoded in some of the speech coding bits, whereby the speech coding bits selected for message transmission have been selected in such a way that they affect the quality of speech as little as possible. Most preferably, the speech coding bits used for transmitting messages are protected by channel coding (702, 704). Speech coding bits are "stolen" for message transmission only for very short periods at a time and only for exactly the time it takes to transmit the messages (114); at other times, the entire speech channel (108) is used normally for speech transmission.

26 Claims, 6 Drawing Sheets

U.S. PATENT DOCUMENTS

| | | | |
|---|---|---|---|
| 5,333,187 | | 7/1994 | Hiraiwa et al. ........................ 379/219 |
| 5,724,410 | * | 3/1998 | Parvulsecu et al. ............... 379/88.18 |
| 5,768,613 | * | 6/1998 | Asghar .................................... 712/35 |
| 5,899,968 | * | 5/1999 | Navarro et al. ....................... 704/220 |
| 5,926,786 | * | 7/1999 | McDonough et al. ................ 704/224 |
| 5,991,717 | * | 11/1999 | Minde et al. ......................... 704/223 |

* cited by examiner

METHOD AND APPARATUS FOR TRANSMITTING MESSAGES IN A TELECOMMUNICATION SYSTEM

This application is the national phase of international application PCT/FI96/00579 filed Oct. 30, 1996 which designated the U.S.

FIELD OF THE INVENTION

Background of the Invention

The invention relates to a method and an apparatus which allow a transmitter of a digital telecommunication system transmitting speech to transmit predetermined messages to a receiver on a speech channel. In many digital telecommunication systems it is necessary to transmit not only encoded speech but also messages containing other information, e.g. messages pertaining to the control of a speech connection or messages containing data completely independent of speech. Such messages are often called signalling.

In telecommunication systems transmitting speech, a speech signal is usually subjected to two coding operations: speech coding and channel coding. Speech coding comprises speech encoding performed in a transmitter by a speech encoder, and speech decoding performed in a receiver by a speech decoder.

Figure 1:
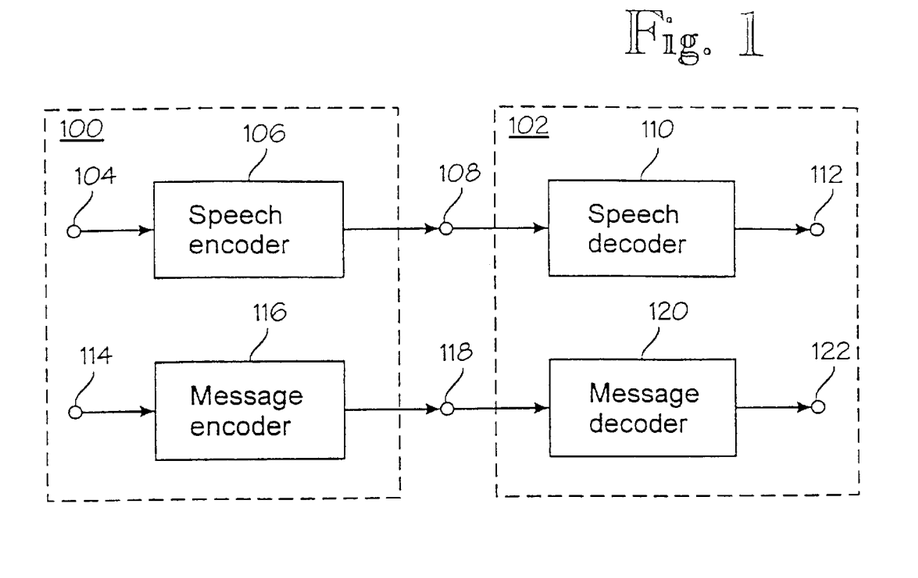
FIGS. 1 to 3 illustrate different known arrangements for transmitting messages and speech substantially simultaneously.

With reference to FIG. 1, a speech encoder 106 located in a transmitter 100 compresses a speech signal so that the number of bits used to represent it per unit of time is reduced. The speech encoder 106 typically processes speech as speech frames containing a certain amount of speech samples. On the basis of sampled speech, the speech encoder 106 calculates speech parameters, each of which is encoded as a separate binary code word. The speech parameters produced by the RPE-LTP speech encoder used in the full-rate channel of the pan-European GSM mobile telephone system are described in ETSI GSM Recommendation 06.10. These parameters are also disclosed in Table 1 of Appendix 1. The RPE-LTP (Regular Pulse Excitation—Long Term Prediction) produces 76 speech parameters from one speech frame of 20 ms (corresponding to 160 speech samples at a sampling frequency of 8 kHz). Recommendation GSM 06.10 also discloses the length of the binary code word assigned for each parameter.

Very often speech encoders also group speech parameters together, in which case each group—instead of a single speech parameter—is encoded to a separate code word. Encoding parameters in groups is called vector quantization. Modern speech encoders usually encode some speech parameters separately and some in groups (the RPE-LTP speech encoder of the example does not employ vector quantization). The result produced by the speech encoder is thus a constant-speed bit stream. The RPE-LTP speech encoder of the invention produces 260 speech coding bits per each speech frame of 20 ms.

The speech decoder 110 of a receiver 102 performs a reverse operation and synthesizes a speech signal 112 from the bits produced by the speech encoder. The decoder 110 receives binary code words and generates corresponding speech parameters on the basis of them. The synthesization is performed by the use of the decoded speech parameters. The speech synthesized in the receiver is, however, not identical with the original speech compressed by the speech encoder, but it has changed more or less as a result of the speech coding. The higher the degree of compression used in the speech coding, the more the quality of speech usually deteriorates in the coding process.

The RPE-LTP speech encoder, for example, compresses a speech signal to a rate of 13 000 bits per second (13 kbps). The compression is performed in such a way that it affects the intelligibility of speech as little as possible. In special cases, such as identification of tone pairs used in tone dialling, the compression may detrimentally affect or even completely obstruct the process.

The above-mentioned channel coding comprises channel encoding performed in the transmitter by a channel encoder, and channel decoding performed in the receiver by a channel decoder. The purpose of channel coding is to protect speech coding bits to be transmitted against errors occurring on the transmission channel. Channel coding may either allow transmission errors to be detected without being able to correct them or it may allow transmission errors to be corrected, provided that the number of errors is smaller than a certain maximum number, which is dependent on the channel coding method.

The channel coding method to be used is selected according to the quality of the transmission channel. In fixed transmission methods, the error probability is often very small, and there is not much need for channel coding. In wireless networks such as mobile telephone networks, however, the error probability is often extremely high, and the channel coding method employed has a significant effect on the quality of speech. In mobile telephone networks, both error-detecting and error-correcting channel coding methods are usually employed simultaneously.

In telecommunication systems transmitting speech, speech coding and channel coding are closely connected. The importance of bits produced by a speech encoder for the quality of speech usually varies such that, in some cases, an error in an important bit may cause an audible disturbance in synthesized speech, whereas several errors in less important bits may be almost imperceptible. How great the difference between the importance of speech coding bits is depends essentially on the speech coding method employed, but at least small differences can be found in most methods. When a speech transmission method is developed for a telecommunication system, channel coding is thus designed together with speech coding to allow the bits that are the most important for the quality of speech to be better protected than less important bits. In a full-rate channel of the GSM, for example, the bits produced by an RPE-LTP speech encoder have been divided into three different classes according to their importance to channel coding: the most important class is protected in channel coding with both an error-correcting and an error-detecting code; the second most important class is protected only with an error-correcting code; and the least important class is not protected in channel coding at all. Table 2 of Appendix 1 shows the classification of bits produced by an RPE-LTP encoder in two different ways: 6-parted subjective classification, and 3-parted classification used by channel coding.

Channel coding is not directly relevant to the principle of the invention. In view of speech coding, channel coding is part of the transmission channel. In view of the practical implementation, channel coding is, however, of essential significance to the transmission of messages as regards the selection of bits, as will be seen from the examples below.

The term "channel" can be interpreted in many ways in the field, wherefore the meaning of the term for the present invention can be specified as follows. When messages and speech are transmitted on separate channels, the receiver can distinguish between message bits and speech coding bits irrespective of the contents of the information transmitted on the channels. However, two channels are not necessarily physically separate channels. Separate channels can also be provided by dividing one physical transmission channel (e.g. a radio path or a transmission line) into a plurality of time slots and frequency ranges. When such a division is made unambiguously, the receiver can distinguish between the channels irrespective of the contents of the information transmitted on them.

Figure 2:
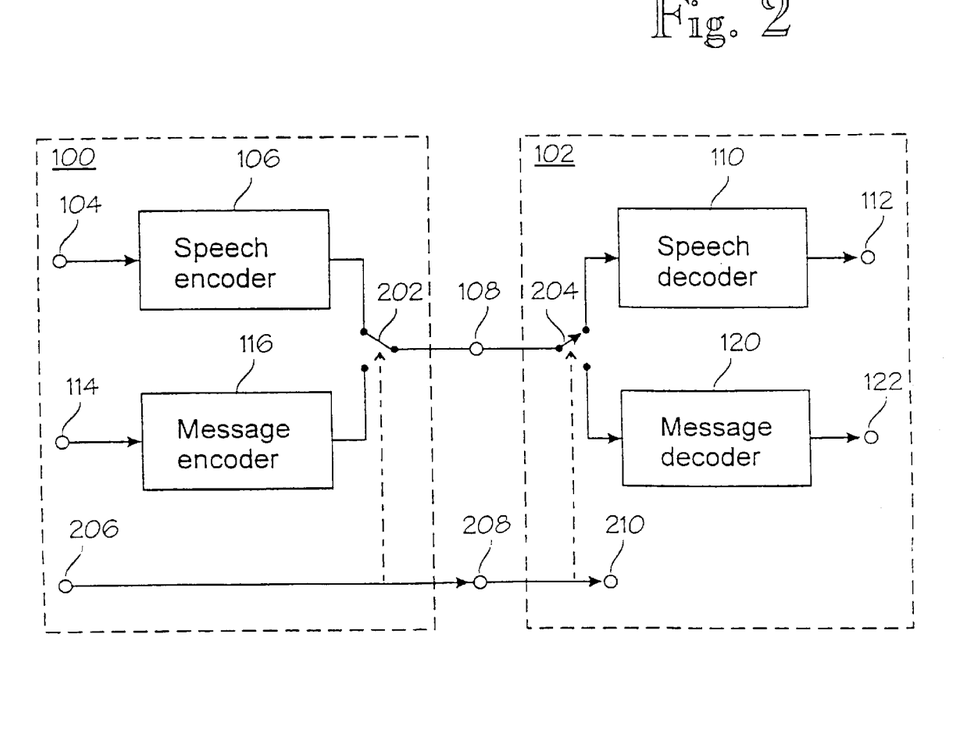
Figure 3:
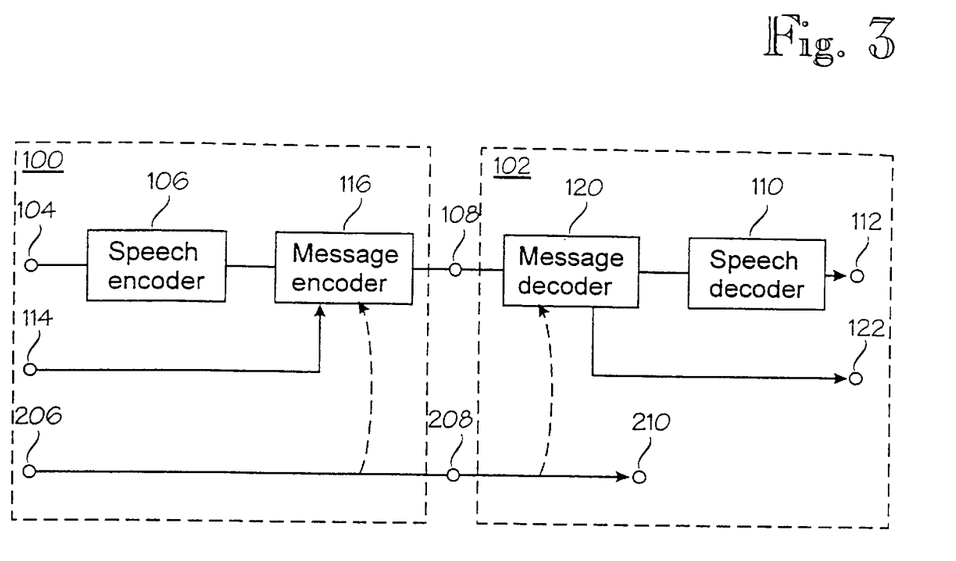

The methods of FIGS. 1 to 3 are employed for transmitting messages substantially simultaneously with speech. The methods will be considered from four points of view. 1: Is a separate transmission channel needed for transmitting messages, or can messages be transmitted on the same channel as speech? 2: How does the transmitter of the message have to communicate to the receiver that a message is on its way? 3: How does the transmission of a message affect the quality of speech transmitted simultaneously? 4: What happens in an old receiver if a new transmitter transmits a message and the message transmission method is not implemented in the old receiver?

FIG. 1 illustrates message transmission most generally known in the art. FIG. 1 shows both a transmitter 100 and a receiver 102. In this arrangement, messages and speech are transmitted on completely different channels. In the transmitter 100, a digital speech signal 104 is supplied to a speech encoder 106, which, from this signal, generates compressed speech coding bits, which are sent to the receiver on a speech channel 108. In the transmitter, a message 114 to be sent to the receiver is supplied to a message encoder 116, which generates message bits, which are then sent to the receiver on a separate message channel 118. The receiver 102 receives the speech coding bits from a speech channel 108 and supplies them to a speech decoder 110, which synthesizes the speech signal 112 to be heard. The receiver 102 receives the message bits from a separate message channel 118 and supplies them to a message decoder 120, which interprets the transmitted message 122.

This arrangement is used, for example, in the SACCH (Slow Associated Control Channel) of the GSM system. A GSM speech channel is always connected to a separate SACCH, on which messages relating to the control of the speech channel are transmitted.

A typical feature of the prior art method shown in FIG. 1 is that when messages and speech are transmitted simultaneously in the system, the combined transmission capacity used for the transmission of messages and speech is always greater than the transmission capacity used for the transmission of speech.

Transmission of messages thus does not affect transmission of speech in any way.

In the light of the above-mentioned viewpoints, the message transmission illustrated in FIG. 1 can be described as follows. 1: Messages and speech are transmitted on different channels. 2: Because a separate channel exists, such a communication is not needed, for all information transmitted on the message channel is message information. 3: A message does not affect the quality of speech. 4: The method of FIG. 1 cannot normally be introduced at all in an existing system, since it is usually impossible to add a separate channel to the system.

FIG. 2 illustrates a second type of message transmission generally known in the art. The parts in FIGS. 2 to 8 that have the same reference numerals as in FIG. 1 also have the same function, wherefore they will not be described again. In the arrangement of FIG. 2, the speech encoder 106 and the message encoder 116 use the same transmission channel 108 at different times. The channel 108 can be used for transmitting messages 114 only for short periods at a time (typically 10 to 30 ms at a time), since transmission of speech 104 must be interrupted for this period, and a long interruption would significantly deteriorate the quality of speech.

When the channel 108 is used for transmitting speech, a transmission switch 202 provided in the transmitter 100 is arranged to allow speech coding bits to be supplied to the channel 108. When messages 114 are transmitted, the switch 202 is arranged to allow message bits to be supplied to the channel 108 instead of speech coding bits. Thus, only speech or message bits are transmitted on the channel 108 at a certain moment of time. The transmitter 100 must therefore separately inform the receiver 102 of whether messages or speech is transmitted on the channel 108. In the transmitter 100 the information 206 is supplied to a separate channel 208. On the basis of this information 210, the receiver places switch 204 in a position that corresponds to that of switch 202. The bits are received from the channel 108 and supplied, according to the position of the switch 204, either to the speech decoder 110 or to the message decoder 120.

This procedure is employed, for example, with a FACCH (Fast Associated Control Channel) of the GSM system. A FACCH is used, for instance, for transmitting messages relating to the management of a speech channel. Is should be noted that a FACCH is not a "channel" in the same sense that the term is understood in connection with the present application. This is because the messages of a FACCH are transmitted on a speech channel as shown in FIG. 2. One bit is always transmitted per one GSM speech frame on a completely different channel to indicate whether the frame contains speech coding bits (normal case) or whether the bits have been "stolen" for message transmission.

In the light of the above-mentioned viewpoints, the message transmission of FIG. 2 can be described as follows. 1: Messages and speech are transmitted on the same channel at different times. The time used for message transmission is very short as compared with the time used for transmission of speech. 2: A communication about whether the channel is used for transmitting speech or messages is sent on a separate channel. 3: A message deteriorates the quality of speech, but only to a very small extent (almost insignificantly). 4: Normally the method cannot be introduced at all in an existing system, as it requires a separate channel for communicating the selection between speech and messages, and it is usually impossible to add such a channel to the system.

FIG. 3 illustrates a third arrangement known in the art, which is specified for simultaneous transmission of data and speech, for example, in recommendations G.722 and G.727 of the former CCITT (present ITU-TSS). These recommendations are descriptions of ADPCM speech coding methods. The method is employed for providing a fixed data channel for use with a speech channel. A speech encoder 106 and a message encoder 116 use the same transmission channel 108 simultaneously in such a way that bits from speech coding are "stolen" for message transmission. A message decoder 120 of the receiver 102 removes the message bits from the speech coding bits, interprets the message 122, and supplies the remaining speech coding bits to the speech decoder 110. The speech decoder 110 synthesizes the speech 112 to be heard. The speech decoder 110 must also know which received bits are speech coding bits and which are message bits. An erroneous interpretation deteriorates the quality of speech significantly.

In this arrangement, the message encoder 116 replaces some of the speech coding bits with bits used for coding the message 114. In ADPCM coding, the bits to be removed can be selected easily such that they have as little effect as possible on the speech quality to be obtained. ADPCM coding uses code words of fixed length, the least important bits of which are replaced with message bits. An ADPCM speech encoder is thus normally designed in such a way that the possibility of stealing bits is taken into account and the effect of such stealing on the quality of speech is already minimized in the encoding method.

Even the arrangement shown in FIG. 3 requires information on which of the bits transmitted on the transmission channel 108 are message bits. This information 206 is sent from the transmitter through a separate channel 208 to the receiver, where the received bits are divided by means of this information 210 into messages 122 and speech 112.

Only little signalling information is required on channel 208, since the same channel division between speech coding and data is maintained for a long time.

In the light of the above-mentioned viewpoints, the arrangement of FIG. 3 can be described as follows. 1: Messages and speech are transmitted on the same channel simultaneously. 2: A communication on whether speech or messages are transmitted on the channel is sent on a separate channel. However, the communication is typically valid for a long time (often during an entire connection), wherefore it requires only very little capacity. 3: A message deteriorates the quality of speech, since messages typically reserve part of the channel permanently for their use. 4: Normally the method cannot be introduced at all in an existing system, for it requires a separate channel for informing of the selection between speech and messages, and it is usually impossible to add such a channel to the system.

It is also known to use the same physical transmission channel for transmitting both speech and digital information. U.S. Pat. No. 4,476,559 (Brolin et al.), for example, discloses such a technique for use in a fixed network. This technique comprises selecting one of three transmission forms (speech, data or their combination), and providing for each transmission form a "ounique signature" (using the terminology of the cited U.S. patent) which is interleaved between transmission signals to indicate the transmission form. However, there are several reasons why the technique disclosed in the U.S. Patent (Brolin) is not suitable for an Ad environment to which the present invention is to be applied. First, according to the U.S. Patent (Brolin), part of the bandwidth is continuously reserved for indicating the selected transmission form, wherefore the entire bandwidth cannot be used for transmission of speech even when there are no messages to be transmitted. In a mobile communication system, and particularly at its air interface, this would be too strict a restriction. Second, according to the U.S. Patent (Brolin), it is assumed that the "unique signature" indicating the transmission form can always be received without any errors. In the case of telecommunication over a radio interface, such an assumption cannot be made.

A problem arises when the telecommunication system is to be changed in a way that has not been anticipated when the system was planned. Let us assume, for example, that more than two speech codecs are to be used in a GSM system. Signalling for this kind of selection has not been designed in the system, and if it is designed afterwards, it cannot be implemented in old equipments that are already in use. To solve this problem, it is necessary to have a signalling method which can be introduced into an existing telecommunication system without disturbing those equipment in use in which this signalling method is not implemented. Using such a method, new equipments can signal with each other to agree on the use of a new codec; the signalling will not succeed with old equipment, and thus the new equipment can conclude that the old speech codec must be used on the connection. Message transmission methods previously used in the field do not usually allow messages to be added to an existing system.

It is possible to design various signalling possibilities for unpredictable cases in advance. If such a signalling possibility exists, it should be used primarily. However, such reserve signalling does not often exist or its introduction may require a time-consuming standardization process. Since there is, in any case, a limited number of reserve signalling possibilities, such signalling cannot be introduced very lightly.

An example of signalling that is designed in advance is the use of a speech coding method. Since the speech encoder of the transmitter and the speech decoder of the receiver must use the same speech coding method, the equipments must agree on the method to be used when the speech connection is being established. Such a situation will arise, for example, in the GSM system, where a half-rate speech codec will soon be introduced in addition to the full-rate speech codec. In the GSM system, the problem of selecting the speech codec has been solved in such a way that when the system was planned, it was already known that there would be two speech codecs even though only one of them is implemented in the present equipments. A signalling method for selecting the speech codec has already been designed in the system in advance. The signalling is implemented in the present equipments, and when new equipments with two speech codecs are introduced later, the new equipments can use the old speech codec when communicating with the old equipments, since the selection of a speech codec is implemented in both the old and the new equipments.

BRIEF SUMMARY OF THE INVENTION

The object of the invention is thus to provide a method which allows new functional properties to be added to an existing telecommunication system intended for transmission of speech by disturbing the equipments already in use in the system ("old" equipments) as little as possible. In addition, the object of the invention is to provide an apparatus for implementing this method.

The invention is based on the idea that messages are transmitted from a transmitter to a receiver on a speech channel, encoded in speech coding bits selected such that the quality of speech is affected as little as possible. Speech coding bits are "stolen" for message transmission only for short periods at a time, and only for precisely the time it takes to transfer the messages; at other times, the entire speech channel is used normally for transmission of speech.

An advantage of the signalling method of the invention is that it allows new properties to be added to existing telecommunication systems. A system may comprise both "new" equipments (in which the signalling method of the invention is implemented) and "old" equipments (in which the method is not implemented). When a new equipment communicates with another new equipment, messages associated with the method are transmitted between the transmitter and the receiver without disturbing the speech connection. When a new equipment communicates with an old equipment, the messages transmitted by the new equipment are not received, but neither is the speech connection disturbed. A receiver employing the method of the invention can detect a message coded among speech coding bits and interpret it without that the speech connection is essentially disturbed; no further information is required for detecting the message. No specific speech frame corresponding to the "unique signature" of the above-mentioned U.S. Pat. No. 4,476,559 (Brolin) is thus required in the present invention to indicate whether information on the channel is to be interpreted as speech or as a message. A receiver in which the message transmission system of the invention is not implemented cannot detect a message coded among speech coding bits, but the existence of the message does not essentially disturb the speech connection.

DESCRIPTION OF THE DRAWINGS

In the following, the invention will be described in greater detail by means of preferred embodiments with reference to the accompanying drawings, in which.

DETAILED DESCRIPTION

Figure 4:
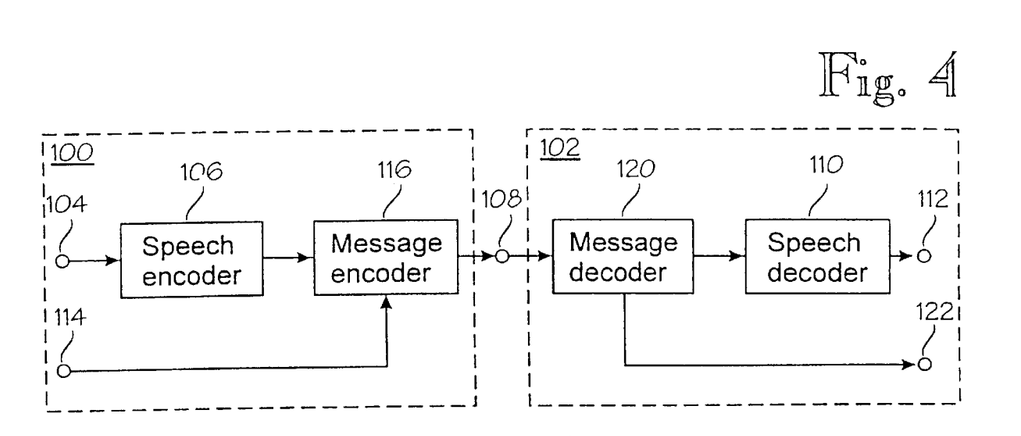
FIG. 4 illustrates a simple arrangement of the invention for transmitting a message.

With reference to FIG. 4, a digital speech signal 104 is supplied in a transmitter 100 to a speech encoder 106, which produces speech coding bits which are supplied to a message encoder 116. The message encoder 116 replaces some of the speech coding bits with bits used for coding the message 114. The bits to be replaced are selected according to the speech coding method in such a way that the quality of speech is affected as little as possible. The bits selected to be replaced are always the same in the method, and the message decoder must be informed of them. The message encoder thus replaces the selected speech coding bits with message bits only when there is a message to be transmitted. Most of the time, only speech coding bits are transmitted on the channel 108.

From channel 108, a bit stream is supplied to a message decoder 120 of the receiver 102. The decoder examines the bits of the received bit stream that have been selected to be replaced, and on the basis of their contents concludes whether the bit stream includes a message. How this conclusion is made will be described later. If a message is detected, the message decoder 120 interprets the message 122. The received bits are forwarded to a speech decoder 110 as such, irrespective of whether they contain a message or not. The speech decoder 110 synthesizes the speech 112 to be heard. During the message, the speech coding bits selected to be replaced receive incorrect values in view of speech coding, which deteriorates the quality of synthesized speech. However, the quality deteriorates only minimally when the messages are short, and the bits to be replaced are correctly selected.

The method of the invention is suitable for use in applications where there is relatively little need for transmitting messages. The interval between successive messages should typically be at least about a second to prevent the quality of speech from deteriorating. Temporarily and in some special cases, messages can be sent even more frequently. The method is thus not suitable for providing a common data channel as the prior art methods described above. However, the method is well suited for transmitting control information and small amounts of data.

How a message decoder can conclude whether the received bits contain a message will be described in the following. The number of different possible messages is very small, e.g. about 20. The selected code words used for coding messages can, however, be very long, e.g. about 100 bits. Normally, a code word of 100 bits can be used for coding $2^{100}$ different messages; in view of this, such a code word is thus much longer than necessary. An advantage of a long code word is that it makes it impossible in practice for a speech encoder to produce one of the 20 selected message code words of e.g. 100 bits by chance. The message decoder 120 can therefore examine the 100 bits used for message coding, and if they form one of the code words, they are interpreted as a message. Otherwise the bits are assumed to be normal speech coding bits. No special signal is therefore required to indicate whether a message is transmitted or not.

The bits selected for message coding thus depend on the speech coding method employed. Table 3 of Appendix 1 shows, by way of example, how the bits can be selected in the case of an RPE-LTP speech coding method of a GSM full-rate channel. The selected bits are indicated in Table 3 by double framing. The numbering in Table 3 corresponds to the numbering of bits in Table 1. From a speech frame of 260 bits, 123 bits have been selected for message coding. Several factors have an effect on the selection. As a whole, the selection must be made in such a way that there is a sufficient number of bits but that they do not affect the quality of speech too much.

The above-mentioned message coding bits are selected on the following grounds. The selected 123 bits are all bits used for describing RPE parameters, and they form a uniform, sufficiently large group. The bits of RPE parameters which belong to class 2 in channel coding have been completely excluded, since they are not protected at all by channel coding, and their error probability in transmission is too high. All bits of the RPE parameters of classes 1*a* and 1*b* (RPE grid position, block amplitude, RPE pulses) have been selected for message coding, which gives the number 123. The effect of these parameters on the quality of speech can be minimized by setting the values of block amplitude parameters in all message code words as zero. The values of these parameters have a direct effect on how the other RPE parameters (RPE grid position and RPE pulses) affect the quality of speech. When the block amplitude is set as zero, the incorrect values of the other parameters no longer have any greater effect. The incorrect value (i.e. zero) of the block amplitude parameters thus slightly deteriorates the quality of speech in the receiver, but this is controlled attenuation which can be kept almost unnoticeable by using short messages (by not encoding messages in successive speech frames). There are altogether 20 block amplitude bits in classes 1*a* and 1*b*, wherefore 103 bits are left for the actual message coding. The main reasons for the selection is thus that the selected bits are protected by channel coding, and that the use of the block amplitude parameter allows the effect of this bit group on the quality of speech to be minimized.

In the light of the viewpoints disclosed in connection with FIG. 1, the arrangement of FIG. 4 can be described as follows. 1: Messages and speech are transmitted on the same channel simultaneously. Messages are transferred only when there are messages to be transmitted in the transmitter. 2: A message decoder concludes from a received bit stream whether it contains a message. No additional signalling is required for this purpose. 3: A message deteriorates the quality of speech only very little, since the messages are short, and the bits used for message transmission have been selected in such a way that they have as little effect on the quality of speech as possible. 4: A receiver, which does not comprise a message decoder, is hardly disturbed at all by messages. Messages are detected by the receiver as transmission errors, and when there is a sufficiently small number of them, they have very little effect. The method can be introduced into an existing system.

As can be seen from the above description, "simultaneous" transmission of speech and messages on the same channel refers to transmitting messages in bits normally used by speech but in a manner in which there is very little effect on the speech as heard by a listener.

It can be seen that, of the known techniques, the ADPCM signalling of FIG. 3 is most closely related to the method of the invention in the sense that both these methods comprise borrowing bits of the speech channel for transmitting messages. An essential difference between these two techniques is that in the method of the invention the additional channel 208 shown in FIGS. 1 to 3 is not needed at all.

Figure 5:
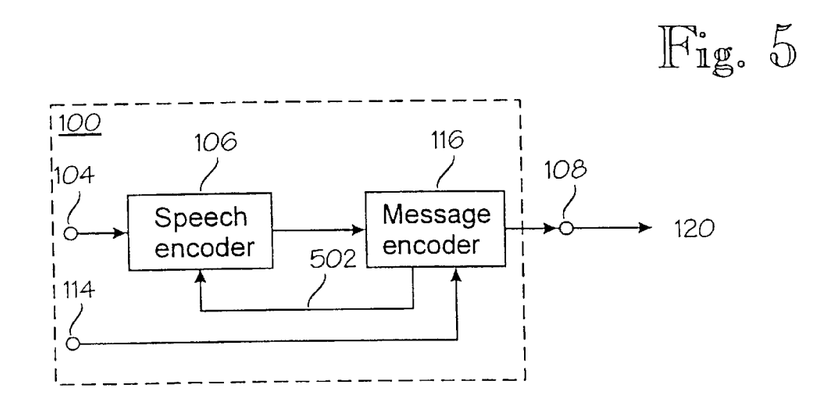
FIGS. 5 to 8 illustrate preferred embodiments of the invention.

FIG. 5 illustrates an alternative embodiment of the transmitter. The difference between this embodiment and the one of FIG. 4 is that there is a feedback 502 from the message encoder 116 to the speech encoder 106. The feedback 502 has the following function: The speech encoders usually function as state machines in such a way that, as a result of a performed speech encoding, the speech encoder 106 is in a certain kind of internal state. This state has an effect on the further operation of the encoder. The speech decoder 110 operates in the same way, and if no errors occur during the transmission, the states of the encoder 106 and the decoder 110 correspond to each other. On account of transmission errors, the state of the decoder 110 may differ from that of the encoder 106, wherefore the quality of the synthesized speech 112 deteriorates. Since the bits stolen by the message encoder 116 cause "transmission errors" from the point of view of the speech decoder 110 of the receiver, the states of the speech encoder 106 and the speech decoder 110 will differ from each other in this way. The difference usually does not affect the quality of speech to any essential degree, but some speech coding methods may have even a great effect. In the embodiment shown in FIG. 5, the discrepancy between the states of the encoder 106 and the decoder 110 can, however, be prevented by feeding the changes caused by the message encoder 116 in the speech coding bits back to the speech encoder 106, which will change its state on the basis of them. As the state of the speech decoder 110 is also determined on the basis of the bits produced by the message encoder 116, the states will not differ from each other.

Figure 6:
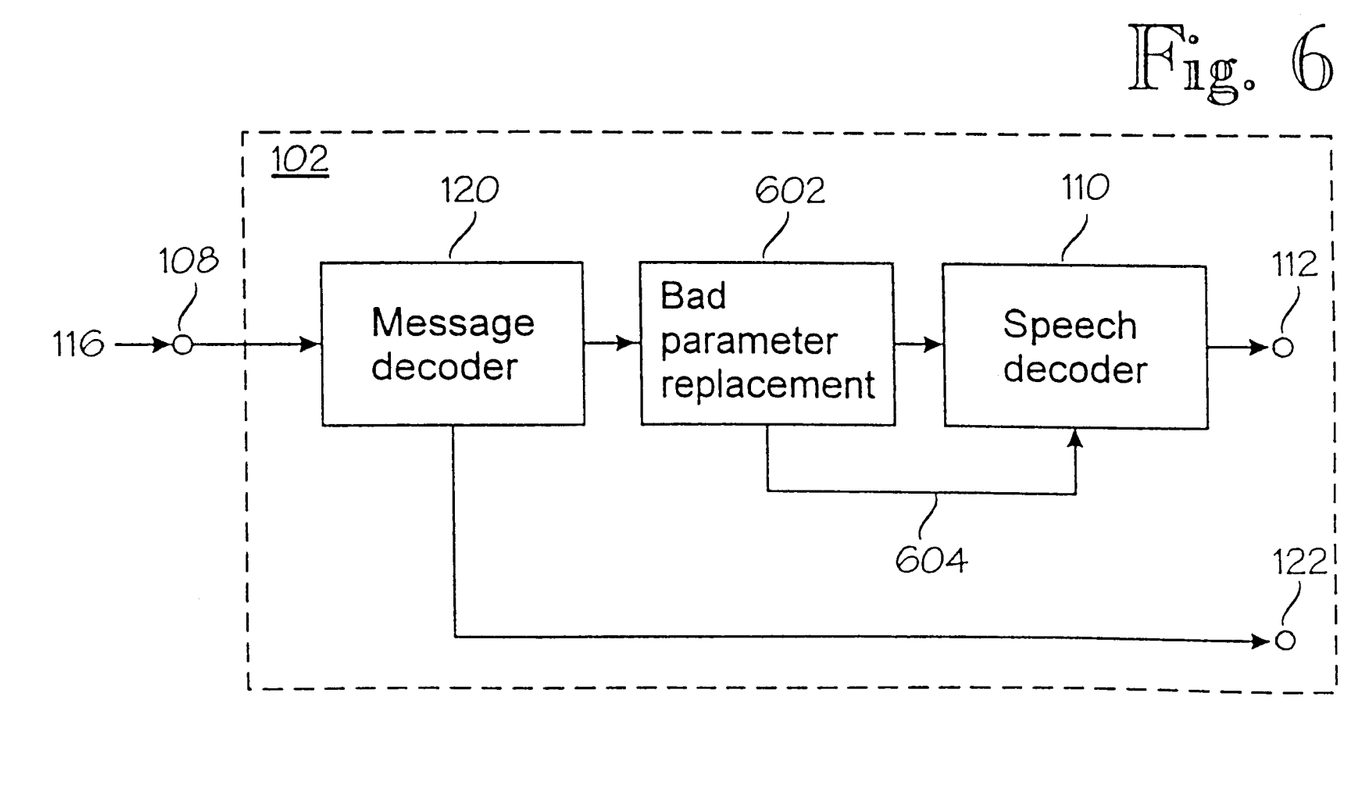

FIG. 6 illustrates an alternative embodiment of the receiver, by which any deterioration of the quality of speech caused by the messages can be reduced in the receiver of the invention. This embodiment differs from the one of FIG. 4 only as regards the receiver. After the message decoder 120 has interpreted a message in the receiver 102, the received bits are supplied to a block 602 which replaces bad parameters. If the speech frame contains a message, the receiver 102 knows that some of the received bits are erroneous. The receiver 102 also knows which of the bits are possibly erroneous, since both the transmitter 100 and the receiver 102 know which bits have been selected for message coding. As a result of the erroneous bits, the corresponding decoded parameters will also be erroneous. Instead of supplying bad parameters to the speech decoder 110 as such, they can be replaced with others, using a method known per se for replacing bad parameters. Such methods are usually based on replacing bad parameters by the use of the same error-free parameters received previously. The method of replacement can be employed in accordance with FIG. 6 if the selection of message coding bits cannot alone eliminate the deteriorating effect of the message on the quality of speech.

When the same system comprises both "new" and "old" equipments, the system will operate as follows. Let us assume at first that the transmitter is "new" and the receiver is "old". Such a situation would result if the message decoder 120 in FIG. 4 were removed. As stated in connection with FIG. 4, the transmitter 100 codes the speech and, if necessary, replaces some of the speech coding bits with bits used for coding the message 114. The "old" receiver 102 does not comprise a message decoder 120, and the bits are supplied directly to a speech decoder 110, which synthesizes the speech 112 to be heard. If the speech coding bits contain a message, the message will deteriorate the quality of speech to some extent. If the message bits have been selected appropriately, the quality will deteriorate only minimally. The receiver 102 does not understand the message, but nor is the speech connection essentially disturbed.

In the reverse case, the transmitter is "old" and the receiver is "new", whereby the system will operate as follows. The transmitter 100 codes the speech as described above and supplies it to a channel 108. An "old" transmitter does not replace speech bits with message bits. The message decoder 120 of the receiver 102 examines whether the received bits contain a message. Since the message code words are very long, the speech coding bits cannot in practice contain a message by chance, wherefore the message decoder 120 supplies the bits as such to a speech decoder 110, which synthesizes the speech 112 to be heard. The message decoder 120 thus never interprets the message 122. The receiver 102 operates in this case as a normal receiver in which the message transmission method in question is not implemented.

Figure 7:
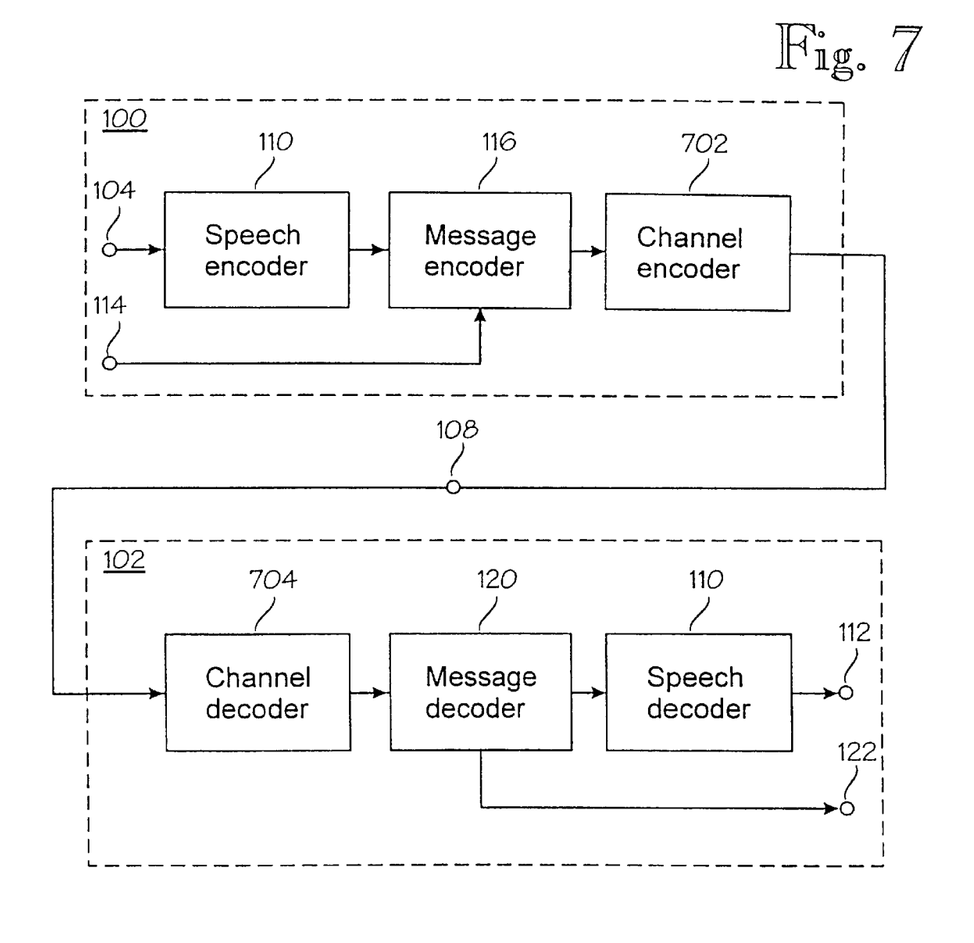

FIG. 7 illustrates the method of the invention in an environment in which channel coding is also visible. If the method is employed in a mobile telephone system, channel coding is always an essential factor for the operation of the system. Channel coding has no effect on the logical operation of the method, but FIG. 7 shows how channel coding is arranged in the method of the invention. Speech coding bits, possibly containing message bits, are supplied from the message encoder 120 to a channel encoder 702, where the bits are protected against errors occurring on the channel 108. In the receiver 102, the bits are at first supplied to a channel decoder 704, which decodes the channel encoding. After that, the bits ,are supplied, to the, message decoder 120, and the operation continues as in the case of FIG. 4.

Transmission errors possibly occurring on the channel 108 have also an effect on the implementation of the present invention. If the probability of transmission errors exists, the reception of messages can be jeopardized. If the error probability of the channel is, for example, 1%, a message code word of 100 bits often contains one or more errors. This can be taken into account in the operation of the message decoder. It is usually not sensible to implement a message decoder in such a manner that it interprets a message as detected only if it is exactly identical with a predetermined message code word. In the practical implementation, a message decoder allows a certain number of errors in a message code word (e.g. up to 3 errors). If a received bit pattern differs from a message code word by not more than the selected maximum number of errors, the message is interpreted as detected. The number of different bits is called the Hamming distance. Such a procedure increases the risk that a bit combination resembling a message code word might occur by chance among speech coding bits. It is, however, possible to find a satisfying compromise by selecting sufficiently long message code words and a sufficiently small number of allowed errors.

In the following, some examples are given of how the message transmission of the invention can be utilized in a mobile telephone system. An extensive application utilizing the present invention is disclosed in the Applicant's copending Finnish Patent Application No. 955267 with the same filing date.

An embodiment is the transmission of DTMF sounds in a GSM system. DTMF (Dual Tone Multi-Frequency) sounds refer to signalling sounds which are used in a public switched telephone network (PSTN) and which are produced by pushing the buttons in a voice-frequency push-button telephone. See e.g. Recommendation T/CS 46-02 (Innsbruck 1981, revised at Nice 1985), "Signalling system for push-button telephones combining basic multifrequency signalling with direct current signalling."

DTMF sounds propagate in the network "acoustically" along a speech channel. Several automatic services offered by a telephone network are controlled by DTMF sounds. DTMF sounds are often also used, for example, for remote unloading a telephone answering machine. The control function of DTMF sounds is based on the fact that their exact form is defined, and the receiver can identify and distinguish between various DTMF sounds and function according to a predetermined practice. There are 16 different DTMF sounds.

The transmission of DTMF sounds in digital mobile telephone networks causes major problems, since the speech coding methods used in these networks are designed for transmission of speech and they distort signalling sounds such as the DTMF sounds. If the network sends a DTMF signal to a GSM mobile telephone (downlink direction), the sound can no longer be reliably identified as a DTMF sound after speech coding. In the GSM, it is possible to transmit DTMF sounds on a separate signalling channel towards the network, but not in the downlink direction.

Figure 8:
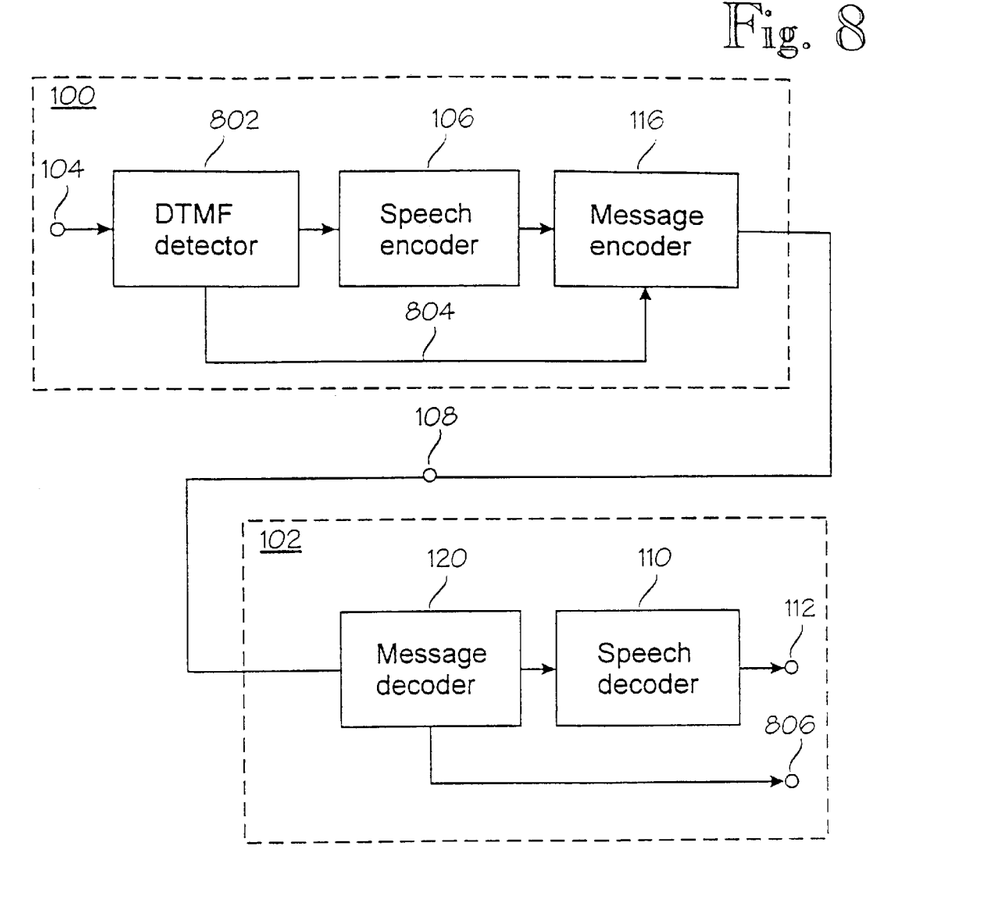

FIG. 8 illustrates how the method of the invention allows DTMF sounds to be reliably transmitted in the downlink direction in a GSM full-rate channel. In this case, the transmitter 100 of FIG. 8 corresponds to a transcoder of a GSM network and the receiver 102 to a GSM mobile station.

The DTMF signalling system of the invention requires 16 message code words to be transmitted in an RPE-LTP speech frame. The message code word bits selected can be the 123 bits shown in Table 4 of Appendix 1. The first row of Table 4 shows the consecutive numbering of the message code word bits. The second row indicates the serial number of the corresponding message code word bit in the RPE-LTP speech frame (see Table 3). The rest of the table comprises 16 rows, one per each message code word. Each code word is 123 bits long, and the code words are divided into four sub-tables. Of these bits, 20 (the block amplitude bits) are set as zero in all the 16 code words. In Table 4 these bits are in bold type. As regards the other 103 bits, the code words can be selected randomly; it should, however, be noted that the code words must be sufficiently different from one another. Table 4 shows the 16 code words of 123 bits chosen for this example. The code words have been chosen in such a way that they all differ from one another by at least 35 bits. Thus there is in practice no risk of the code words getting mixed up. The code words of Table 4 are thus predetermined and known both at the transmitter and at the receiver.

An audio signal 104 (which may be speech or a DTMF signalling sound) is supplied in the transmitter 100 to a DTMF detector 802, which examines whether the signal is one of the 16 DTMF sounds. The information is sent to the message encoder 116. The audio signal is further transmitted to the speech encoder 110, which processes the speech, as described above. If the DTMF detector 802 has detected a DTMF sound, it sends a signal to the message encoder 116 over connection 804. This signal makes the message encoder 116 replace the 123 speech coding bits corresponding to the message coding bits with a code word corresponding to the detected DTMF sound. Otherwise the message encoder 116 will transmit the speech coding bits to the channel 108 as such.

The message decoder 120 of the receiver 102 examines the 123 speech coding bits selected for the message transmission. If the receiver 102 detects one of the DTMF code words, it sends this information 806 for further operations. Instead of a separate received DTMF message 806 or in addition to it, the receiver 102 may synthesize a "pure" DTMF sound pair to the speech output 112 of the receiver. Since transmission errors may occur on the speech channel 108, the message decoder 116 may interpret the code word as detected, if the received word differs from the code word, for example, by less than 5 bits. The message decoder transmits the received bits to the speech decoder 907, which synthesizes the audio sound 908 to be heard.

The method allows the receivers provided with a message decoder of the invention to detect DTMF sounds reliably. Previously used receivers in which the method is not implemented do not benefit from DTMF signalling transmitted among speech coding bits, but nor does the signalling disturb them.

A third embodiment of the invention is the use of the method for creating an interactive protocol. The method of the invention is well suited for forming an interactive protocol. Since one field of use of the invention is introducing new properties to an existing telecommunication system, the communicating equipments must often agree, at the beginning of a speech connection and also during it, on the methods to be used. If, for instance, a new speech coding method is to be used, the communicating equipments must at the beginning of the speech connection have a dialogue, i.e. perform handshaking, during which they can observe that it is possible to use the new speech coding method.

The communicating equipments in the telecommunication system are mainly transceivers. The same equipment thus comprises both a transmitter and a receiver. In this case, creating a protocol means simply that after the receiver of the transceiver has received a message, it informs the corresponding transmitter of the message; the transmitter reacts to it by sending a "treply" to the received message. It is thus possible to accomplish a dialogue between two transceivers. During such a dialogue it is possible to ask whether a new speech coding method can be used and to reply to the question.

The method of the invention thus makes it possible to plan protocols of this kind without disturbing the equipments that have been previously used in the system. If one of the communicating equipments is not provided with a message transmission method of the invention, it cannot reply according to the protocol to another equipment, which can thus conclude that the new function (in this case, a new speech coding method) cannot be used during this speech connection.

The invention has been described by way of example with reference to the GSM system. It should, however, be understood that the embodiments and examples described are in all respects illustrative, not restrictive. Corresponding parameters can also be found in many other digital telecommunication systems. It will be obvious to one skilled in the art that, as the technology advances, the basic idea of the invention can be implemented and the invention can be applied in many different ways. Thus the invention and the embodiments thereof are not limited to the examples described above, but they can be modified within the scope of the appended claims.

Appendix 1 to Patent Application

"Method and apparatus for transmitting messages in a telecommunication system"

TABLE 1

| Parameter group | Parameter number | Parameter name | Variable name | Number of bits | Bit number (LSB–MSB) |
|---|---|---|---|---|---|
| Short term filter parameters | 1 | Log area ratio 1 | LAP 1 | 6 | 1–6 |
|  | 2 | Log area ratio 2 | LAR 2 | 6 | 7–12 |
|  | 3 | Log area ratio 3 | LAR 3 | 5 | 13–17 |
|  | 4 | Log area ratio 4 | LAR 4 | 5 | 18–22 |
|  | 5 | Log area ratio 5 | LAR 5 | 4 | 23–26 |
|  | 6 | Log area ratio 6 | LAR 6 | 4 | 27–30 |
|  | 7 | Log area ratio 7 | LAR 7 | 3 | 31–33 |
|  | 8 | Log area ratio 8 Sub-frame no. 1 | LAR 8 | 3 | 34–36 |
| Long term prediction parameters RPE parameters | 9 | LTP lag | $N_1$ | 7 | 37–43 |
|  | 10 | LTP gain | $b_1$ | 2 | 44–45 |
|  | 11 | RPE grid position | $M_1$ | 2 | 46–47 |
|  | 12 | block amplitude | $X_{max1}$ | 6 | 48–53 |
|  | 13 | RPE-pulse no. 1 | $x_1(1)$ | 3 | 54–56 |
|  | 14 | RPE-pulse no. 2 | $x_1(2)$ | 3 | 57–59 |
|  | ... | ... | ... | ... | ... |
|  | 25 | RPE-pulse no. 13 Sub-frame no. 2 | $x_1(13)$ | 3 | 90–92 |
| Long term prediction parameters RPE parameters | 26 | LTP lag | $N_2$ | 7 | 93–99 |
|  | 27 | LTP gain | $b_2$ | 2 | 100–101 |
|  | 28 | RPE grid position | $M_2$ | 2 | 102–103 |
|  | 29 | Block amplitude | $X_{max2}$ | 6 | 104–109 |
|  | 30 | RPE-pulse no. 1 | $x_1(1)$ | 3 | 110–112 |
|  | 31 | RPE-pulse no. 2 | $x_2(2)$ | 3 | 113–115 |
|  | ... | ... | ... | ... | ... |
|  | 42 | RPE-pulse no. 13 Sub-frame no. 3 | $x_2(13)$ | 3 | 146–148 |
| Long term prediction parameters RPE parameters | 43 | LTP lag | $N_3$ | 7 | 149–155 |
|  | 44 | LTP gain | $b_3$ | 2 | 156–157 |
|  | 45 | RPE gain position | $M_3$ | 2 | 158–159 |
|  | 46 | Block amplitude | $X_{max3}$ | 6 | 160–165 |
|  | 47 | RPE-pulse no. 1 | $x_3(1)$ | 3 | 166–168 |
|  | 48 | RPE-pulse no. 2 | $X_3(2)$ | 3 | 169–171 |
|  | ... | ... | ... | ... | ... |
|  | 59 | RPE-pulse no. 13 Sub-frame no. 4 | $X_3(13)$ | 3 | 202–204 |
| Long term prediction parameters RPE parameters | 60 | LTP lag | $N_4$ | 7 | 205–211 |
|  | 61 | LTP gain | b4 | 2 | 212–213 |
|  | 62 | RPE grid position | $M_4$ | 2 | 214–215 |
|  | 63 | Block amplitude | $X_{max4}$ | 6 | 216–221 |
|  | 64 | RPE-pulse no. 1 | $x_4(1)$ | 3 | 222–224 |
|  | 65 | RPE-pulse no. 2 | $x_4(2)$ | 3 | 225–227 |
|  | ... | ... | ... | ... | ... |
|  | 76 | RPE-pulse no. 13 | $x_4(13)$ | 3 | 258–260 |

TABLE 2

| Importance classes | | Parameter name | Parameter number | Bit index (LSB = 0) | Bit number |
|---|---|---|---|---|---|
| 1 5 bits | 1a 50 bits | Log area ratio 1 | 1 | 5 | 6 |
|  |  | 12, 29, 46, 63 | 5 | 53, 109, 165, 221 |  |
| 2 3 bits |  | Log area ratio 1 | 1 | 4 | 5 |
|  |  | Log area ratio 2 | 2 | 5 | 12 |
|  |  | Log area ratio 3 | 3 | 4 | 17 |
| 3 31 bits |  | Log area ratio 1 | 1 | 3 | 4, |
|  |  | Log area ratio 2 | 2 | 4 | 11 |
|  |  | Log area ratio 3 | 3 | 3 | 16 |
|  |  | Log area ratio 4 | 4 | 4 | 122 |
|  |  | LTP lag (4 sub-frames) | 9, 26, 43, 60 | 6 | 43, 99, 155, 211 |

TABLE 2-continued

| Importance classes | | Parameter name | Parameter number | Bit index (LSB = 0) | Bit number |
|---|---|---|---|---|---|
| | | Block amplitude (4 sub-frames) | 12, 29, 46, 63 | 4 | 52, 108, 164, 220 |
| | | Log area ratio 2, 5, 6 | 2, 5, 6 | 3 | 10, 26, 30 |
| | | LTP lag (4 sub-frames) | 9, 26, 43, 60 | 5 | 42, 98, 154, 210 |
| | | LTP lag (4 sub-frames) | 9, 26, 43, 60 | 4 | 41, 97, 153, 209 |
| | | LTP lag (4 sub-frames) | 9, 26, 43, 60 | 3 | 40, 96, 152, 208 |
| | | LTP lag (4 sub-frames) | 9, 26, 43, 60 | 2 | 39, 95, 151, 207 |
| 4 25 bits | | Block amplitude (4 sub-frames) | 12, 29, 46, 63 | 3 | 51, 107, 163, 219 |
| | | Log area ratio 1 | 1 | 2 | 3, |
| | | Log area ratio 4 | 4 | 3 | 21 |
| | | Log area ratio 7 | 7 | 2 | 33 |
| | | LTP lag (4 sub-frames) | 9, 26, 43, 60 | 1 | 38, 94, 150, 206 |
| | 1b | Log area ratio 5, 6 | 5, 6 | 2 | 25, 29 |
| | 128 bits | LTP gain (4 sub-frames) | 10, 27, 44, 61 | 1 | 45, 101, 157, 213 |
| | | LTP lag (4 sub-frames) | 9, 26, 43, 60 | 0 | 37, 93, 149, 205 |
| | | RPE grid position (4 sub-frames) | 11, 28, 45, 62 | 1 | 47, 103, 159, 215 |
| 5 123 bits | | Log area ratio 1 | 1 | 1 | 2 |
| | | Log area ratio 2, 3, 8, 4 | 2, 3, 8, 4 | 2 | 9, 15, 36, 20 |
| | | Log area ratio 5, 7 | 5, 7 | 1 | 24, 32 |
| | | LTP gain (4 sub-frames) | 10, 27, 44, 61 | 0 | 44, 100, 156, 212 |
| | | Block amplitude (4 sub-frames) | 12, 29, 46, 63 | 2 | 50, 106, 162, 218 |
| | | RPE pulses (sub-frame 1) | 12–25 | 2 | 56, 59, 62, 65, 68, 71, 74, 77, 80, 83, 86, 89, 92 |
| | | RPE pulses (sub-frame 2) | 30–42 | 2 | 112, 115, 118, 121, 124, 127, 130, 133, 136, 139, 142, 145, 148 |
| | | RPE pulses (sub-frame 3) | 47–59 | 2 | 168, 171, 174, 177, 180, 183, 186, 189, 192, 195, 198, 201, 204 |
| | | RPE pulses (sub-frame 4) | 64–76 | 2 | 224, 227, 230, 233, 236, 239, 242, 245, 248, 251, 254, 257, 260 |
| | | RPE grid position (4 sub-frames) | 11, 28, 45, 62 | 0 | 46, 102, 158, 214 |
| | | Block amplitude (4 sub-frames) | 12, 29, 46, 63 | 1 | 49, 105, 161, 217 |
| | | RPE pulses (sub-frame 1) | 13–25 | 1 | 55, 58, 61, 64, 67, 70, 73, 76, 79, 82, 85, 88, 91 |
| | | RPE pulses (sub-frame 2) | 30–42 | 1 | 111, 114, 117, 120, 123, 126, 129, 132, 135, 138, 141, 144, 147 |
| | | RPE pulses (sub-frame 3) | 47–59 | 1 | 167, 170, 173, 176, 179, 182, 185, 188, 191, 194, 197, 200, 203 |
| | | RPE pulses (sub-frame 4) | 64–67 | 1 | 223, 226, 229, 232 |
| | 2 | RPE pulses (sub-frame 4) | 68–76 | 1 | 235, 238, 241, 244, 247, 250, 253, 256, 259 |
| 6 73 bits | 78 bits | Log area ratio 1 | 1 | 0 | 1 |
| | | Log area ratios 2, 3, 6 | 2, 3, 6 | 1 | 8, 14, 28 |
| | | Log area ratios 7 | 7 | 0 | 31 |
| | | Log area ratios 8 | 8 | 1 | 35 |
| | | Log area ratios 8, 3 | 8, 3 | 0 | 34, 13 |
| | | Log area ratios 4 | 4 | 1 | 19 |
| | | Log area ratios 4, 5 | 4, 5 | 0 | 18, 23 |
| | | Block amplitude (4 sub-frames) | 12, 29, 46, 63 | 0 | 48, 104, 160, 216 |
| | | RPE pulses (sub-frame 1) | 13–25 | 0 | 54, 57, 60, 63, 66, 69, 72, 75, 78, 81, 84, 87, 90 |
| | | RPE pulses (sub-frame 2) | 30–42 | 0 | 110, 113, 116, 119, 124, 127, 128, 131, 134, 137, 140, 143, 146 |
| | | RPE pulses (sub-frame 3) | 47–59 | 0 | 166, 169, 172, 175, 178, 181, 184, 187, 190, 193, 196, 199, 202 |
| | | RPE pulses (sub-frame 4) | 64–76 | 0 | 222, 225, 228, 231, 234, 237, 240, 243, 246, 249, 252, 255, 258 |
| | | Log area ratios 2, 6 | 2, 6 | 0 | 7, 27 |

TABLE 3

| | | | | | | | | | | | | | | | | | | | |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 |
| 21 | 22 | 23 | 24 | 25 | 26 | 27 | 28 | 29 | 30 | 31 | 32 | 33 | 34 | 35 | 36 | 37 | 38 | 39 | 40 |
| 41 | 42 | 43 | 44 | 45 | 46 | 47 | 48 | 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 | 73 | 74 | 75 | 76 | 77 | 78 | 79 | 80 |
| 81 | 82 | 83 | 84 | 85 | 86 | 87 | 88 | 89 | 90 | 91 | 92 | 93 | 94 | 95 | 96 | 97 | 98 | 99 | 100 |
| 101 | 102 | 103 | 104 | 105 | 106 | 107 | 108 | 109 | 110 | 111 | 112 | 113 | 114 | 115 | 116 | 117 | 118 | 119 | 120 |

TABLE 3-continued

| | | | | | | | | | | | | | | | | | | | |
|---|---|---|---|---|---|---|---|---|---|---|---|---|---|---|---|---|---|---|---|
| 121 | 122 | 123 | 124 | 125 | 126 | 127 | 128 | 129 | 130 | 131 | 132 | 133 | 134 | 135 | 136 | 137 | 138 | 139 | 140 |
| 141 | 142 | 143 | 144 | 145 | 146 | 147 | 148 | 149 | 150 | 151 | 152 | 153 | 154 | 155 | 156 | 157 | 158 | 159 | 160 |
| 161 | 162 | 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 | 199 | 200 |
| 201 | 202 | 203 | 204 | 205 | 206 | 207 | 208 | 209 | 210 | 211 | 212 | 213 | 214 | 215 | 216 | 217 | 218 | 219 | 220 |
| 221 | 222 | 223 | 224 | 225 | 226 | 227 | 228 | 229 | 230 | 231 | 232 | 233 | 234 | 235 | 236 | 237 | 238 | 239 | 240 |
| 241 | 242 | 243 | 244 | 245 | 246 | 247 | 248 | 249 | 250 | 251 | 252 | 253 | 254 | 255 | 256 | 257 | 258 | 259 | 260 |

TABLE 4

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|
| 46 | 47 | 49 | 50 | 51 | 52 | 53 | 55 | 56 | 58 | 59 | 61 | 62 | 64 | 65 | 67 | 68 | 70 | 71 | 73 | 74 | 76 | 77 | 79 | 80 | 82 | 83 | 85 | 86 | 88 | 89 |
| 1 | 1 | 0 | 0 | 0 | 0 | 0 | 1 | 1 | 0 | 0 | 1 | 1 | 1 | 0 | 0 | 0 | 1 | 1 | 1 | 0 | 1 | 0 | 1 | 1 | 1 | 1 | 0 | 0 | 1 | 1 |
| 1 | 1 | 0 | 0 | 0 | 0 | 0 | 0 | 0 | 1 | 0 | 0 | 0 | 1 | 1 | 1 | 1 | 1 | 0 | 0 | 1 | 0 | 1 | 0 | 1 | 0 | 1 | 0 | 0 | 0 | 1 |
| 1 | 0 | 0 | 0 | 0 | 0 | 0 | 0 | 0 | 0 | 1 | 0 | 1 | 0 | 0 | 1 | 1 | 0 | 1 | 0 | 1 | 1 | 0 | 1 | 1 | 0 | 0 | 1 | 1 | 1 | 1 |
| 1 | 1 | 0 | 0 | 0 | 0 | 1 | 0 | 0 | 0 | 0 | 0 | 1 | 0 | 0 | 1 | 0 | 1 | 1 | 0 | 1 | 1 | 0 | 1 | 1 | 0 | 0 | 1 | 0 | 1 | 0 |
| 1 | 1 | 0 | 0 | 0 | 0 | 0 | 0 | 0 | 1 | 1 | 0 | 0 | 0 | 1 | 0 | 1 | 0 | 1 | 1 | 1 | 0 | 0 | 0 | 1 | 0 | 1 | 0 | 0 | 0 | 0 |
| 1 | 1 | 0 | 0 | 0 | 0 | 0 | 1 | 0 | 0 | 1 | 1 | 0 | 1 | 0 | 1 | 0 | 1 | 1 | 0 | 1 | 1 | 1 | 1 | 1 | 1 | 1 | 0 | 1 | 1 | 0 |
| 0 | 1 | 0 | 0 | 0 | 0 | 0 | 1 | 1 | 0 | 1 | 0 | 1 | 0 | 1 | 0 | 1 | 1 | 0 | 0 | 1 | 0 | 1 | 0 | 0 | 0 | 0 | 0 | 0 | 1 | 1 |
| 1 | 1 | 0 | 0 | 0 | 0 | 0 | 0 | 0 | 0 | 1 | 1 | 0 | 1 | 0 | 1 | 0 | 1 | 0 | 0 | 1 | 1 | 1 | 0 | 1 | 0 | 1 | 0 | 1 | 0 | 1 |
| 0 | 1 | 0 | 0 | 0 | 0 | 1 | 1 | 1 | 1 | 0 | 1 | 0 | 0 | 0 | 1 | 0 | 1 | 1 | 1 | 1 | 0 | 1 | 0 | 0 | 1 | 1 | 0 | 0 | 1 | 0 |
| 1 | 1 | 0 | 0 | 0 | 0 | 0 | 1 | 1 | 0 | 1 | 0 | 1 | 0 | 0 | 0 | 0 | 1 | 0 | 0 | 0 | 0 | 0 | 0 | 0 | 0 | 0 | 0 | 1 | 1 | 1 |
| 1 | 1 | 0 | 0 | 0 | 0 | 0 | 0 | 1 | 1 | 0 | 1 | 0 | 1 | 1 | 0 | 0 | 0 | 0 | 0 | 0 | 1 | 1 | 0 | 0 | 0 | 0 | 1 | 0 | 1 | 1 |
| 1 | 0 | 0 | 0 | 0 | 0 | 1 | 0 | 0 | 1 | 1 | 1 | 0 | 1 | 0 | 1 | 1 | 0 | 1 | 1 | 0 | 1 | 0 | 0 | 1 | 0 | 1 | 0 | 0 | 1 | 1 |
| 1 | 1 | 0 | 0 | 0 | 0 | 1 | 1 | 1 | 1 | 0 | 1 | 0 | 1 | 0 | 1 | 0 | 0 | 0 | 0 | 1 | 1 | 1 | 1 | 1 | 1 | 1 | 0 | 1 | 1 | 0 |
| 0 | 0 | 0 | 0 | 0 | 0 | 0 | 1 | 1 | 1 | 1 | 0 | 1 | 1 | 1 | 1 | 0 | 1 | 1 | 1 | 1 | 1 | 0 | 1 | 0 | 0 | 1 | 0 | 1 | 0 | 1 |
| 0 | 0 | 0 | 0 | 0 | 0 | 0 | 1 | 1 | 1 | 0 | 0 | 0 | 0 | 0 | 0 | 0 | 1 | 0 | 1 | 1 | 0 | 1 | 1 | 0 | 1 | 1 | 1 | 1 | 1 | 0 |
| 0 | 0 | 0 | 0 | 0 | 0 | 1 | 1 | 0 | 1 | 0 | 1 | 1 | 1 | 1 | 1 | 0 | 1 | 1 | 1 | 1 | 0 | 1 | 0 | 0 | 1 | 1 | 1 | 1 | 0 | 1 |

| 32 | 33 | 34 | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|---|---|
| 91 | 92 | 102 | 103 | 105 | 106 | 107 | 108 | 109 | 111 | 112 | 114 | 115 | 117 | 118 | 120 | 121 | 123 | 124 | 126 | 127 |
| 0 | 0 | 1 | 1 | 0 | 0 | 0 | 0 | 0 | 0 | 1 | 1 | 0 | 1 | 1 | 0 | 1 | 1 | 1 | 1 | 0 |
| 1 | 1 | 0 | 0 | 0 | 0 | 0 | 0 | 0 | 0 | 0 | 1 | 1 | 0 | 0 | 0 | 1 | 1 | 0 | 1 | 0 |
| 1 | 1 | 0 | 0 | 0 | 0 | 0 | 0 | 0 | 1 | 0 | 0 | 1 | 0 | 1 | 1 | 1 | 1 | 1 | 1 | 0 |
| 1 | 0 | 1 | 0 | 0 | 0 | 0 | 0 | 0 | 0 | 0 | 0 | 0 | 1 | 1 | 1 | 0 | 0 | 0 | 1 | 0 |
| 1 | 0 | 1 | 1 | 0 | 0 | 0 | 0 | 0 | 1 | 0 | 1 | 0 | 1 | 1 | 0 | 1 | 1 | 1 | 1 | 1 |
| 0 | 0 | 1 | 1 | 0 | 0 | 0 | 0 | 0 | 0 | 1 | 0 | 1 | 1 | 1 | 1 | 1 | 1 | 1 | 1 | 0 |
| 0 | 0 | 1 | 1 | 0 | 0 | 0 | 0 | 0 | 0 | 1 | 0 | 1 | 0 | 0 | 0 | 1 | 0 | 1 | 1 | 1 |
| 1 | 1 | 1 | 1 | 0 | 0 | 0 | 0 | 0 | 1 | 0 | 1 | 0 | 0 | 0 | 1 | 0 | 1 | 1 | 0 | 0 |
| 0 | 0 | 0 | 0 | 0 | 0 | 0 | 0 | 0 | 0 | 0 | 1 | 1 | 1 | 0 | 0 | 0 | 1 | 1 | 1 | 1 |
| 0 | 1 | 1 | 1 | 0 | 0 | 0 | 0 | 0 | 0 | 0 | 1 | 0 | 0 | 1 | 1 | 0 | 1 | 0 | 1 | 1 |
| 0 | 0 | 1 | 1 | 0 | 0 | 0 | 0 | 0 | 1 | 1 | 1 | 0 | 1 | 1 | 1 | 1 | 0 | 0 | 0 | 0 |
| 1 | 0 | 1 | 1 | 0 | 0 | 0 | 0 | 0 | 1 | 1 | 0 | 0 | 1 | 1 | 0 | 0 | 1 | 1 | 0 | 1 |
| 1 | 1 | 0 | 1 | 0 | 0 | 0 | 0 | 0 | 1 | 0 | 1 | 1 | 0 | 0 | 1 | 1 | 1 | 1 | 1 | 0 |
| 0 | 1 | 0 | 1 | 0 | 0 | 0 | 0 | 0 | 0 | 0 | 1 | 1 | 0 | 1 | 1 | 1 | 1 | 1 | 1 | 0 |
| 0 | 0 | 0 | 0 | 0 | 0 | 0 | 0 | 0 | 1 | 0 | 1 | 0 | 1 | 1 | 1 | 0 | 0 | 1 | 0 | 0 |
| 1 | 0 | 1 | 1 | 0 | 0 | 0 | 0 | 0 | 1 | 1 | 0 | 1 | 1 | 0 | 1 | 0 | 1 | 0 | 0 | 1 |
| 1 | 1 | 0 | 1 | 0 | 0 | 0 | 0 | 0 | 1 | 1 | 1 | 0 | 0 | 1 | 1 | 1 | 1 | 0 | 0 | 0 |
| 0 | 1 | 0 | 1 | 0 | 0 | 0 | 0 | 0 | 0 | 1 | 1 | 1 | 0 | 1 | 1 | 1 | 1 | 1 | 1 | 0 |
| 0 | 0 | 0 | 0 | 0 | 0 | 0 | 0 | 0 | 0 | 0 | 1 | 1 | 1 | 1 | 1 | 1 | 0 | 0 | 1 | 0 |
| 1 | 1 | 0 | 0 | 0 | 0 | 0 | 1 | 1 | 0 | 0 | 1 | 1 | 0 | 0 | 1 | 0 | 1 | 0 | 0 | 0 |

| 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|
| 129 | 130 | 132 | 133 | 135 | 136 | 138 | 139 | 141 | 142 | 144 | 145 | 147 | 148 | 158 | 159 | 161 | 162 | 163 | 164 |
| 0 | 1 | 1 | 0 | 1 | 0 | 0 | 1 | 0 | 0 | 1 | 1 | 1 | 1 | 1 | 0 | 0 | 0 | 0 | 0 |
| 1 | 1 | 0 | 0 | 1 | 0 | 1 | 0 | 0 | 1 | 0 | 1 | 1 | 0 | 1 | 1 | 0 | 0 | 0 | 0 |
| 0 | 1 | 0 | 0 | 1 | 0 | 1 | 1 | 1 | 0 | 1 | 0 | 1 | 0 | 0 | 0 | 0 | 0 | 0 | 0 |
| 0 | 1 | 0 | 0 | 1 | 0 | 0 | 0 | 0 | 0 | 0 | 0 | 1 | 1 | 1 | 1 | 0 | 0 | 0 | 0 |
| 0 | 1 | 0 | 1 | 1 | 0 | 0 | 0 | 0 | 1 | 1 | 1 | 0 | 0 | 0 | 0 | 0 | 0 | 0 | 0 |
| 0 | 1 | 1 | 1 | 1 | 0 | 1 | 0 | 1 | 0 | 0 | 1 | 1 | 0 | 1 | 1 | 0 | 0 | 0 | 0 |
| 0 | 0 | 1 | 1 | 0 | 0 | 1 | 1 | 0 | 0 | 0 | 0 | 1 | 1 | 0 | 0 | 0 | 0 | 0 | 0 |
| 1 | 1 | 0 | 1 | 0 | 1 | 0 | 0 | 1 | 1 | 1 | 1 | 1 | 1 | 0 | 0 | 0 | 0 | 0 | 0 |
| 1 | 1 | 0 | 0 | 0 | 1 | 1 | 0 | 1 | 0 | 0 | 1 | 0 | 1 | 1 | 0 | 0 | 0 | 0 | 0 |
| 0 | 0 | 0 | 0 | 1 | 1 | 1 | 1 | 0 | 1 | 0 | 0 | 1 | 0 | 1 | 0 | 0 | 0 | 0 | 0 |
| 1 | 1 | 0 | 1 | 1 | 0 | 0 | 0 | 1 | 0 | 0 | 0 | 1 | 1 | 1 | 0 | 0 | 0 | 0 | 0 |
| 0 | 1 | 0 | 1 | 0 | 0 | 1 | 1 | 0 | 1 | 1 | 1 | 0 | 0 | 0 | 0 | 0 | 0 | 0 | 0 |
| 1 | 0 | 0 | 1 | 0 | 0 | 0 | 1 | 0 | 1 | 0 | 0 | 1 | 0 | 1 | 0 | 0 | 0 | 0 | 0 |
| 1 | 0 | 1 | 0 | 1 | 0 | 0 | 1 | 1 | 0 | 0 | 0 | 1 | 0 | 0 | 0 | 0 | 0 | 0 | 0 |
| 1 | 1 | 1 | 1 | 0 | 1 | 1 | 0 | 0 | 0 | 1 | 1 | 0 | 1 | 0 | 0 | 0 | 0 | 0 | 0 |
| 0 | 1 | 0 | 1 | 1 | 0 | 0 | 1 | 0 | 1 | 0 | 1 | 1 | 0 | 1 | 0 | 0 | 0 | 0 | 0 |

TABLE 4-continued

| 73 | 74 | 75 | 76 | 77 | 78 | 79 | 80 | 81 | 82 | 83 | 84 | 85 | 86 | 87 | 88 | 89 | 90 | 91 | 92 | 93 |
|---|---|---|---|---|---|---|---|---|---|---|---|---|---|---|---|---|---|---|---|---|
| 165 | 167 | 168 | 170 | 171 | 173 | 174 | 176 | 177 | 179 | 180 | 182 | 183 | 185 | 186 | 188 | 189 | 191 | 192 | 194 | 195 |
| 0 | 0 | 0 | 1 | 1 | 0 | 0 | 1 | 1 | 1 | 0 | 0 | 0 | 0 | 0 | 1 | 1 | 1 | 1 | 0 | 1 |
| 0 | 0 | 1 | 0 | 1 | 1 | 0 | 0 | 1 | 0 | 1 | 1 | 0 | 0 | 0 | 0 | 0 | 0 | 0 | 1 | 0 |
| 0 | 0 | 0 | 0 | 1 | 0 | 0 | 1 | 1 | 1 | 1 | 0 | 0 | 1 | 1 | 0 | 0 | 1 | 1 | 0 | 0 |
| 0 | 0 | 1 | 1 | 1 | 1 | 0 | 1 | 1 | 1 | 1 | 1 | 0 | 0 | 1 | 0 | 1 | 0 | 0 | 1 | 0 |
| 0 | 1 | 1 | 1 | 1 | 0 | 1 | 1 | 0 | 1 | 0 | 1 | 1 | 1 | 1 | 1 | 0 | 0 | 1 | 1 | 1 |
| 0 | 1 | 0 | 1 | 1 | 1 | 1 | 0 | 0 | 0 | 0 | 1 | 1 | 0 | 0 | 1 | 1 | 1 | 1 | 0 | 0 |
| 0 | 0 | 1 | 1 | 1 | 1 | 0 | 0 | 1 | 1 | 0 | 0 | 0 | 1 | 1 | 1 | 0 | 0 | 1 | 0 | 1 |
| 0 | 0 | 0 | 0 | 1 | 1 | 1 | 1 | 0 | 1 | 0 | 0 | 0 | 0 | 1 | 1 | 0 | 1 | 1 | 1 | 1 |
| 0 | 0 | 1 | 0 | 1 | 0 | 1 | 0 | 1 | 1 | 0 | 0 | 1 | 1 | 1 | 0 | 1 | 1 | 0 | 0 | 0 |
| 0 | 1 | 1 | 1 | 1 | 1 | 1 | 1 | 1 | 1 | 0 | 0 | 0 | 0 | 0 | 0 | 1 | 0 | 0 | 0 | 0 |
| 0 | 0 | 1 | 1 | 0 | 0 | 0 | 0 | 0 | 0 | 1 | 0 | 1 | 0 | 0 | 0 | 1 | 0 | 0 | 0 | 1 |
| 0 | 0 | 1 | 0 | 0 | 1 | 0 | 0 | 1 | 1 | 0 | 0 | 1 | 1 | 1 | 0 | 1 | 0 | 1 | 0 | 0 |
| 0 | 1 | 0 | 1 | 1 | 0 | 1 | 1 | 0 | 1 | 0 | 1 | 0 | 1 | 1 | 1 | 1 | 0 | 0 | 0 | 0 |
| 0 | 0 | 0 | 1 | 1 | 0 | 1 | 1 | 1 | 1 | 0 | 1 | 0 | 0 | 0 | 0 | 0 | 0 | 0 | 0 | 1 |
| 0 | 0 | 0 | 0 | 1 | 1 | 0 | 1 | 0 | 0 | 1 | 0 | 0 | 1 | 1 | 1 | 1 | 0 | 1 | 1 | 1 |
| 0 | 0 | 1 | 0 | 1 | 1 | 1 | 0 | 1 | 0 | 0 | 0 | 0 | 0 | 1 | 1 | 0 | 1 | 0 | 1 | 0 |

| 94 | 95 | 96 | 97 | 98 | 99 | 100 | 101 | 102 | 103 | 104 | 105 | 106 | 107 | 108 | 109 | 110 | 111 | 112 | 113 | 114 |
|---|---|---|---|---|---|---|---|---|---|---|---|---|---|---|---|---|---|---|---|---|
| 197 | 198 | 200 | 201 | 203 | 204 | 214 | 215 | 217 | 218 | 219 | 220 | 221 | 223 | 224 | 226 | 227 | 229 | 230 | 232 | 233 |
| 0 | 0 | 1 | 0 | 1 | 1 | 1 | 0 | 0 | 0 | 0 | 0 | 0 | 0 | 0 | 1 | 0 | 1 | 1 | 0 | 0 |
| 0 | 1 | 1 | 1 | 0 | 1 | 1 | 0 | 0 | 0 | 0 | 0 | 0 | 0 | 0 | 1 | 1 | 1 | 1 | 0 |
| 0 | 1 | 0 | 1 | 0 | 1 | 0 | 1 | 0 | 0 | 0 | 0 | 0 | 1 | 1 | 1 | 1 | 0 | 0 | 0 | 0 |
| 1 | 1 | 1 | 1 | 0 | 0 | 1 | 1 | 0 | 0 | 0 | 0 | 0 | 1 | 0 | 1 | 0 | 0 | 0 | 1 | 0 |
| 1 | 0 | 1 | 1 | 1 | 0 | 0 | 1 | 0 | 0 | 0 | 0 | 0 | 0 | 1 | 1 | 0 | 0 | 1 | 1 | 1 |
| 1 | 1 | 0 | 0 | 0 | 0 | 1 | 0 | 0 | 0 | 0 | 0 | 0 | 0 | 0 | 1 | 1 | 1 | 0 | 0 | 1 |
| 1 | 0 | 1 | 0 | 1 | 1 | 1 | 1 | 0 | 0 | 0 | 0 | 0 | 0 | 0 | 0 | 0 | 0 | 1 | 0 |
| 1 | 0 | 1 | 1 | 1 | 0 | 0 | 1 | 0 | 0 | 0 | 0 | 1 | 1 | 1 | 1 | 1 | 1 | 0 | 1 |
| 1 | 1 | 1 | 1 | 1 | 1 | 0 | 0 | 0 | 0 | 0 | 0 | 1 | 0 | 1 | 0 | 1 | 0 | 0 | 0 | 0 |
| 1 | 0 | 0 | 0 | 0 | 1 | 0 | 0 | 0 | 0 | 0 | 0 | 1 | 1 | 1 | 0 | 1 | 1 | 0 | 1 |
| 0 | 0 | 1 | 1 | 1 | 1 | 0 | 1 | 0 | 0 | 0 | 0 | 1 | 0 | 0 | 0 | 0 | 0 | 0 | 0 |
| 1 | 1 | 1 | 0 | 0 | 0 | 1 | 0 | 0 | 0 | 0 | 0 | 1 | 0 | 0 | 0 | 0 | 0 | 1 | 1 |
| 1 | 0 | 1 | 0 | 1 | 1 | 1 | 0 | 0 | 0 | 0 | 0 | 1 | 1 | 0 | 0 | 0 | 1 | 1 | 0 |
| 1 | 1 | 1 | 0 | 0 | 1 | 0 | 0 | 0 | 0 | 0 | 0 | 0 | 1 | 1 | 1 | 0 | 0 | 1 | 0 |
| 1 | 0 | 1 | 0 | 0 | 0 | 0 | 0 | 0 | 0 | 0 | 0 | 1 | 0 | 1 | 0 | 0 | 0 | 1 | 0 |
| 0 | 1 | 1 | 1 | 1 | 0 | 0 | 1 | 0 | 0 | 0 | 0 | 0 | 0 | 0 | 1 | 0 | 1 | 1 | 0 | 1 |

| 115 | 116 | 117 | 118 | 119 | 120 | 121 | 122 | 123 |
|---|---|---|---|---|---|---|---|---|
| 236 | 239 | 242 | 245 | 248 | 251 | 254 | 257 | 260 |
| 1 | 0 | 1 | 0 | 0 | 1 | 0 | 1 | 0 |
| 0 | 0 | 1 | 0 | 1 | 1 | 0 | 1 | 0 |
| 0 | 0 | 0 | 1 | 0 | 1 | 0 | 0 | 1 |
| 1 | 0 | 0 | 1 | 0 | 1 | 1 | 0 | 1 |
| 0 | 0 | 1 | 1 | 1 | 0 | 0 | 0 | 0 |
| 1 | 1 | 1 | 0 | 1 | 0 | 0 | 1 | 0 |
| 1 | 1 | 0 | 1 | 1 | 0 | 0 | 0 | 0 |
| 1 | 1 | 1 | 1 | 1 | 0 | 1 | 1 | 0 |
| 1 | 1 | 0 | 0 | 0 | 0 | 1 | 1 | 1 |
| 0 | 0 | 1 | 0 | 0 | 1 | 1 | 0 | 1 |
| 1 | 1 | 0 | 1 | 1 | 0 | 0 | 0 | 1 |
| 1 | 0 | 1 | 1 | 0 | 0 | 0 | 1 | 0 |
| 1 | 1 | 1 | 0 | 0 | 0 | 1 | 0 | 0 |
| 1 | 0 | 1 | 1 | 0 | 1 | 1 | 0 | 1 |
| 0 | 0 | 0 | 0 | 1 | 1 | 1 | 0 | 1 |
| 0 | 1 | 0 | 1 | 0 | 1 | 0 | 0 | 1 |

What is claimed is:

1. A method for transmitting messages simultaneously with speech in a digital telecommunication system; said method comprising coding speech to speech frames which consist of bits and which are positioned in a transmission signal; and transmitting each message by making at least one change in said transmission signal; wherein the messages are transmitted in short sequences relative to the speech information in a speech frame;

for each possible message, a corresponding predetermined bit group is defined;

said at least one change in said transmission signal comprises replacing less than all of the bits of the corresponding speech frame with said predetermined bit group corresponding to the message; and said at least one change in said transmission signal is restricted in time to the transmission moment of the speech frame corresponding to said message such that no other indication of the presence of the message is required.

2. A method according to claim 1, characterized in that said replacing the bits of speech frames with a predetermined bit group comprises:

setting parameters corresponding to the intensity of the sound of the speech frame to be transmitted in such a way that the amplitude of the received speech frame is minimized; and positioning the bit group corresponding to the message in a part of the speech frame which is protected in the system against transmission errors.

3. A method according to claim 2, characterized in that the method is used in connection with full-rate speech coding of a GSM-type system and:
   the amplitude of the speech frame is minimised by setting the block amplitude parameters of the speech frame to be transmitted substantially as zero; and
   the bit group corresponding to the message is positioned in the bits corresponding to the RPE parameters of the speech frame.

4. A method according to claim 1, wherein the number of possible messages is 20 or less and the bit groups corresponding to the messages are selected such that the Hamming distance between them is as great as possible.

5. A method according to claim 1, further comprising:
   monitoring any DTMF signals that may occur in the speech; and
   in response to the detection of a DTMF signal in the speech, generating a message corresponding to said DTMF signal.

6. A method according to claim 5, further comprising preventing the propagation of a DTMF signal as a DTMF sound to the signal of the transmission channel.

7. A method for receiving a message of short duration in a digital telecommunication system, said method comprising receiving speech frames, some of which contain a message, wherein:
   a corresponding predetermined bit group is defined per each possible message; and
   identification of speech frames containing messages is based only on examination of the contents of the speech frames; and
   identification of a speech frame as a message requires at least that said speech frame contains a bit group which corresponds to one of said messages, wherein the speech frames are interpreted as messages when the speech frame contains a bit group which differs from a predetermined bit group associated with a message by no more than a predetermined threshold value the bit group including less than all bits of the speech frame.

8. A method according to claim 7, wherein the predetermined threshold value is five bits.

9. A method according to claim 8, wherein identification of a speech frame as a message further requires that the parameters corresponding to the intensity of the sound of a speech frame are below a second predetermined threshold to make the speech signal inaudible.

10. A method according to claim 7, wherein at least some messages correspond to different DTMF sounds, and if a speech frame is interpreted as a message corresponding to a DTMF sound, the DTMF sound corresponding to the message is generated.

11. A method according to claim 7, wherein the speech frames that are concluded to contain messages are processed as messages and as normal speech frames.

12. A method according to claim 7, wherein the speech frames that are concluded to contain messages are processed as messages and as bad speech frames.

13. A transmitter of a digital telecommunication system, comprising a speech encoder for encoding speech to speech frames consisting of bits, and a message encoder for encoding messages to a signal of a transmission channel common to the speech and messages;
   said transmitter being arranged to make at least one change in the signal of the transmission channel in order to transmit each message simultaneously with speech;
   wherein the transmitter is further arranged to:
   transmit messages for short periods at a time relative to the time associated with a speech frame;
   code each message to a corresponding predetermined bit group;
   restrict said change in the signal of the transmission channel in time to the transmission moment of the speech frame corresponding to said message; and
   replace less than all of the bits of the speech frame corresponding to said message with the corresponding predetermined bit group associated with said message; whereby no other indication of the transmission moment of the message is required.

14. A transmitter according to claim 13, wherein the speech encoder is implemented as a state machine to which a feedback signal is further supplied from the message encoder whereby the speech encoder is arranged to change state during transmission of messages such that the effect of the transmission of message on the quality of speech is minimized.

15. A transmitter according to claim 13, wherein the transmitter is arranged to:
   set the parameters corresponding to the intensity of the sound of the speech frame to be transmitted in such a way that the amplitude of the received speech frame is minimized; and
   position the bit group corresponding to the message in the part of the speech frame which is best protected against transmission errors.

16. A transmitter according to claim 15, wherein the transmitter is part of a GSM system, and the transmitter is arranged to:
   minimize the amplitude of the received speech frame by setting the block amplitude parameters of the speech frame to be transmitted below a predetermined threshold to make the speech signal inaudible; and
   position the bit group corresponding to the message in the bits corresponding to the RPE parameters of the speech frame.

17. A transmitter according to claim 13, further comprising:
   a DTMF detector for detecting DTMF signals occurring in a speech signal and for informing the message encoder of such a detection; and
   the message encoder is arranged to generate a message corresponding to said DTMF signal in response to the detection of the DTMF signal.

18. A transmitter according to claim 17, wherein the DTMF detector or the message encoder are further arranged to substantially prevent the propagation of a DTMF signal as a DTMF sound to the transmission channel.

19. A receiver of a digital telecommunication system, comprising a speech decoder for generating speech from speech frames, and a message decoder for decoding messages wherein a corresponding predetermined bit group is defined per each possible message; and the receiver is arranged to:
   receive a signal comprising speech frames, some of which contain a message;
   identify the speech frames containing messages only on the basis of the contents of the speech frames; and
   monitor at least whether a speech frame contains a bit group which corresponds to one of said messages, and when it does, to interpret said speech frame as a message, the bit group including less than all bits of the speech frame.

20. A receiver according to claim 19, wherein the message decode is arranged to supply messages from the speech frames that are concluded to contain messages to the speech decoder.

21. A receiver according to claim 19, wherein the message decoder is arranged to supply the speech frames containing messages to the speech decoder through a bad parameter replacement block.

22. A receiver according to claim 19, wherein at least some messages correspond to different DTMF sounds, and the receiver is arranged, in response to a speech frame being interpreted as a message corresponding to a DTMF sound, to generate the DTMF sound corresponding to the message.

23. A transmitter according to claim 19, wherein the number of messages is less than 20, and the bit groups corresponding to the messages are selected such that the Hamming distance between them is as great as possible.

24. A signal of a speech channel in a digital telecommunication system, wherein the speech to be transmitted is coded as speech frames, some of which contain a message, wherein the changes to be made in the signal of the speech channel in order to transmit a message are restricted in time to the transmission moment of the message, and that less than all of the bits of the said speech frame are replaced with a predetermined bit group corresponding to said message.

25. A signal of a speech channel according to claim 24, wherein said changing further comprises that the parameters corresponding to the intensity of the sound of the speech frames corresponding to the transmission moment are below a predetermined threshold to make the speech signal inaudible.

26. A signal of a speech channel according to claim 25, wherein the signal is used in connection with full-rate speech coding of a GSM system, and in order to improve the immunity to disturbance, the block amplitude parameters of the speech frame are below a predetermined threshold to make the speech signal inaudible, and the RPE parameters are bit groups other than zero in such a manner that a different bit group corresponds to each different message and the Hamming distance between the bit groups is as great as possible.

* * * * *